(12) United States Patent
Ogata et al.

(10) Patent No.: US 10,340,521 B2
(45) Date of Patent: Jul. 2, 2019

(54) NON-AQUEOUS ELECTROLYTE SECONDARY BATTERY

(71) Applicant: SANYO Electric Co., Ltd., Daito-shi, Osaka (JP)

(72) Inventors: Atsushi Ogata, Osaka (JP); Yoshiyuki Muraoka, Osaka (JP); Katsunori Yanagida, Hyogo (JP); Masanobu Takeuchi, Osaka (JP); Fumiharu Niina, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 134 days.

(21) Appl. No.: 15/119,617

(22) PCT Filed: Feb. 13, 2015

(86) PCT No.: PCT/JP2015/000656
§ 371 (c)(1),
(2) Date: Aug. 17, 2016

(87) PCT Pub. No.: WO2015/129187
PCT Pub. Date: Sep. 3, 2015

(65) Prior Publication Data
US 2017/0062818 A1 Mar. 2, 2017

(30) Foreign Application Priority Data
Feb. 28, 2014 (JP) .................. 2014-037870

(51) Int. Cl.
*H01M 4/505* (2010.01)
*H01M 4/525* (2010.01)
(Continued)

(52) U.S. Cl.
CPC ......... *H01M 4/505* (2013.01); *H01M 2/1653* (2013.01); *H01M 4/131* (2013.01);
(Continued)

(58) Field of Classification Search
CPC ...... H01M 4/505; H01M 4/485; H01M 4/364; H01M 2/1653; H01M 10/0587;
(Continued)

(56) References Cited

U.S. PATENT DOCUMENTS 6,960,335 B1 * 11/2005 Singhal .................. B82Y 30/00
423/594.15
2003/0054248 A1 3/2003 Noda et al.
(Continued)

FOREIGN PATENT DOCUMENTS

CN 1360739 A 7/2002
CN 102237511 A 11/2011
(Continued)

OTHER PUBLICATIONS

International Search Report dated Mar. 31, 2015, issued in counterpart International Application No. PCT/JP2015/000656 (2 pages).
(Continued)

*Primary Examiner* — Wojciech Haske
(74) *Attorney, Agent, or Firm* — Westerman, Hattori, Daniels & Adrian, LLP

(57) ABSTRACT

An object of the invention is to provide a nonaqueous electrolyte secondary battery having good cycle characteristics. The nonaqueous electrolyte secondary battery of the present invention includes a positive electrode containing a positive electrode active material, a negative electrode containing a negative electrode active material, a separator interposed between the positive electrode and the negative electrode, and a nonaqueous electrolyte. The positive electrode active material is a layered lithium transition metal oxide, and the positive electrode active material has a crystallite size of 140 nm or less. The negative electrode
(Continued)

active material contains at least carbon, and the nonaqueous electrolyte contains 2 to 30% by volume of fluoroethylene carbonate.

6 Claims, 2 Drawing Sheets

(51) Int. Cl.
| | |
|---|---|
| H01M 10/0569 | (2010.01) |
| H01M 4/131 | (2010.01) |
| H01M 10/0567 | (2010.01) |
| H01M 4/133 | (2010.01) |
| H01M 10/0525 | (2010.01) |
| H01M 2/16 | (2006.01) |
| H01M 4/36 | (2006.01) |
| H01M 4/587 | (2010.01) |
| H01M 4/62 | (2006.01) |
| H01M 4/66 | (2006.01) |
| H01M 10/0568 | (2010.01) |
| H01M 10/0587 | (2010.01) |
| H01M 4/485 | (2010.01) |
| H01M 4/02 | (2006.01) |
| H01M 4/04 | (2006.01) |
| H01M 4/1391 | (2010.01) |
| H01M 4/1393 | (2010.01) |

(52) U.S. Cl.
CPC ........... *H01M 4/133* (2013.01); *H01M 4/364* (2013.01); *H01M 4/485* (2013.01); *H01M 4/525* (2013.01); *H01M 4/587* (2013.01); *H01M 4/623* (2013.01); *H01M 4/625* (2013.01); *H01M 4/661* (2013.01); *H01M 10/0525* (2013.01); *H01M 10/0567* (2013.01); *H01M 10/0568* (2013.01); *H01M 10/0569* (2013.01); *H01M 10/0587* (2013.01); *H01M 4/0404* (2013.01); *H01M 4/0435* (2013.01); *H01M 4/1391* (2013.01); *H01M 4/1393* (2013.01); *H01M 2004/021* (2013.01); *H01M 2004/027* (2013.01); *H01M 2004/028* (2013.01); *H01M 2220/30* (2013.01); *H01M 2300/0034* (2013.01); *H01M 2300/0042* (2013.01)

(58) Field of Classification Search
CPC .. H01M 10/0568; H01M 4/661; H01M 4/587; H01M 4/525; H01M 4/623; H01M 4/625; H01M 10/0569; H01M 4/133; H01M 10/0525; H01M 10/0567; H01M 4/131; H01M 2004/027; H01M 2004/028; H01M 2300/0042; H01M 2300/0034; H01M 4/0404; H01M 4/0435; H01M 4/1391; H01M 4/1393
See application file for complete search history.

(56) References Cited

U.S. PATENT DOCUMENTS

| | | | |
|---|---|---|---|
| 2006/0166098 A1* | 7/2006 | Tabuchi | H01M 4/134 429/232 |
| 2011/0123849 A1* | 5/2011 | Ryu | H01M 2/1686 429/144 |
| 2011/0262796 A1 | 10/2011 | Shimooka et al. | |
| 2012/0288742 A1 | 11/2012 | Tanaka et al. | |
| 2013/0052508 A1 | 2/2013 | Kim et al. | |
| 2013/0052544 A1 | 2/2013 | Ohkuba et al. | |
| 2013/0157117 A1 | 6/2013 | Matsumoto et al. | |
| 2013/0273439 A1 | 11/2013 | Tanaka et al. | |
| 2015/0050564 A1 | 2/2015 | Mizuno et al. | |

FOREIGN PATENT DOCUMENTS

| | | |
|---|---|---|
| CN | 103081208 A | 5/2013 |
| EP | 2 565 965 A1 | 3/2013 |
| JP | 2003-346809 A | 12/2003 |
| JP | 2007-250415 A | 9/2007 |
| JP | 2008-210618 A | 9/2008 |
| JP | 2012-227154 A | 11/2012 |
| JP | 2013-182807 A | 9/2013 |
| JP | 2013-239307 A | 11/2013 |
| JP | 2014-13659 A | 1/2014 |
| WO | 2011/108464 A1 | 9/2011 |
| WO | 2013/042176 A1 | 3/2013 |

OTHER PUBLICATIONS

English translation of Search Report dated Mar. 16, 2018, issued in counterpart Chinese Application No. 201580007993.8. (2 pages).

\* cited by examiner

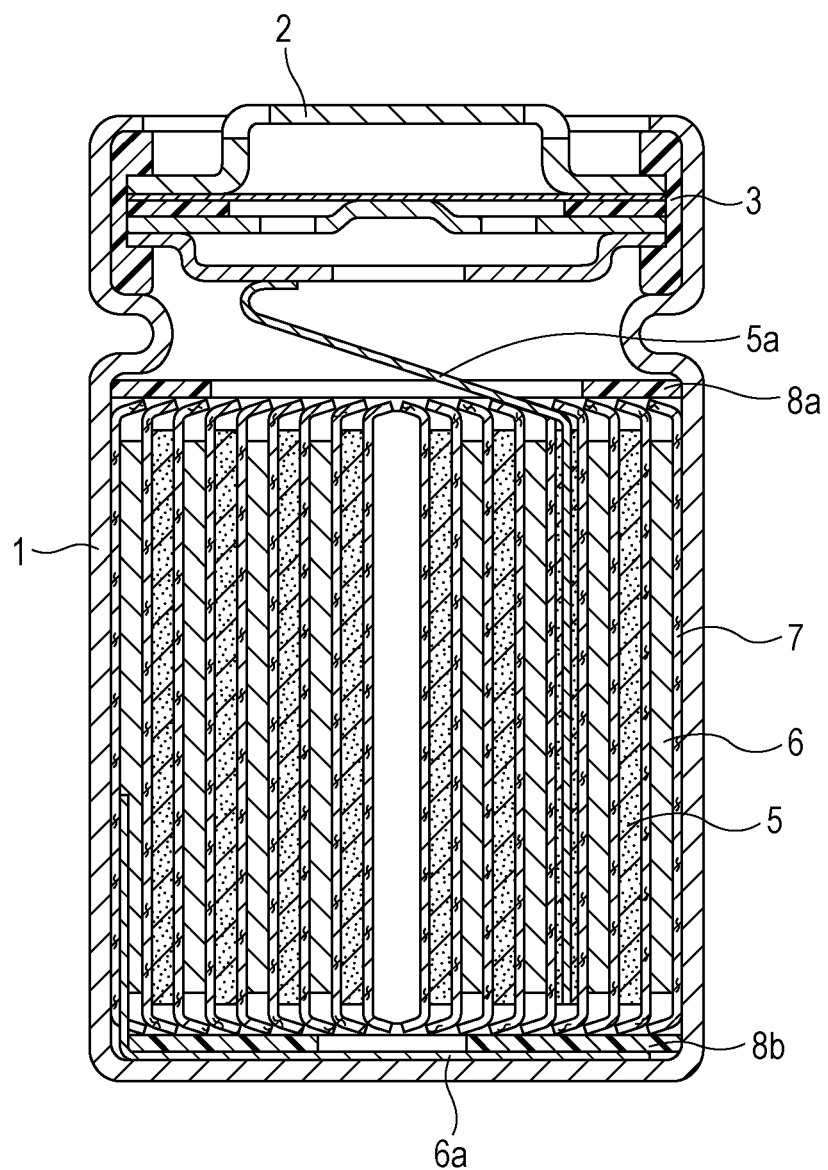

NON-AQUEOUS ELECTROLYTE SECONDARY BATTERY

TECHNICAL FIELD

The present invention relates to a high-capacity and high-durability nonaqueous electrolyte secondary battery.

BACKGROUND ART

With the recent rapid spread of portable and cordless electronic devices, the demand for small, lightweight, and high-energy density secondary batteries used as power sources for driving these electronic devices is increasing. As the applications of secondary batteries are broadened from small consumer electronic devices to electric power storage and electric vehicles, technological development of large secondary batteries that are required to have high capacity and high durability is accelerated.

From the above point of view, nonaqueous electrolyte secondary batteries, particularly lithium secondary batteries, are expected to be used for electrical devices, power storage, and power sources of electric vehicles because these secondary batteries offer high voltage and have high energy density.

The above-described nonaqueous electrolyte secondary battery includes a positive electrode, a negative electrode, and a separator interposed therebetween, and lithium cobalt oxide (e.g., $LiCoO_2$) that has a high potential with respect to lithium and can be easily synthesized is used as a positive electrode active material.

In recent years, for the purpose of achieving an increase in capacity, layered active materials composed mainly of nickel and three-component layered compounds including nickel, cobalt, and manganese are used as positive electrode active materials. Various carbon materials such as graphite are used as negative electrode active materials, and a polyolefin-made microporous film is mainly used as the separator. A nonaqueous electrolyte solution prepared by dissolving a lithium salt such as $LiBF_4$ or $LiPF_6$ in an aprotic organic solvent is used as the nonaqueous electrolyte.

When a charge-discharge cycle is repeated for a long time, side reaction products of the electrolyte solution with the positive electrode active material and the negative electrode active material are accumulated. This causes a reduction in discharge capacity, and deterioration in durability occurs disadvantageously. In view of the above, PTL 1 proposes the use of cyclic carbonate in which at least 60% by mass thereof is fluoroethylene carbonate (hereinafter may be referred to as FEC) having a fluorine atom directly bonded to the carbonate ring. In this case, a coating containing a reduction product of the FEC is formed on the surface of the negative electrode active material during charge and discharge, and this allows an improvement in cycle characteristics. However, even when the technique proposed in PTL 1 is used, sufficiently good cycle characteristics are not obtained.

CITATION LIST

Patent Literature

PTL 1: Japanese Published Unexamined Patent Application No. 2007-250415

SUMMARY OF INVENTION

Technical Problem

An object of the present invention is to provide a nonaqueous electrolyte secondary battery in which an increase in the resistance of the positive electrode during charge and discharge is suppressed to allow good cycle characteristics to be achieved.

Solution to Problem

A nonaqueous electrolyte secondary battery according to one aspect of the present invention includes a positive electrode containing a positive electrode active material, a negative electrode containing a negative electrode active material, a separator interposed between the positive electrode and the negative electrode, and a nonaqueous electrolyte. The positive electrode active material is a layered lithium transition metal oxide, and the positive electrode active material has a crystallite size of 140 nm or less. The negative electrode active material contains at least carbon, and the nonaqueous electrolyte contains 2 to 30% by volume of fluoroethylene carbonate.

Advantageous Effects of Invention

In the nonaqueous electrolyte secondary battery provided by the aspect of the present invention, an increase in the resistance of the positive electrode during charge and discharge is suppressed, and the cycle characteristics can be dramatically improved.

BRIEF DESCRIPTION OF DRAWINGS

FIG. 2 is a schematic cross-sectional view of a cylindrical nonaqueous electrolyte secondary battery in an embodiment.

DESCRIPTION OF EMBODIMENTS

Figure 1:
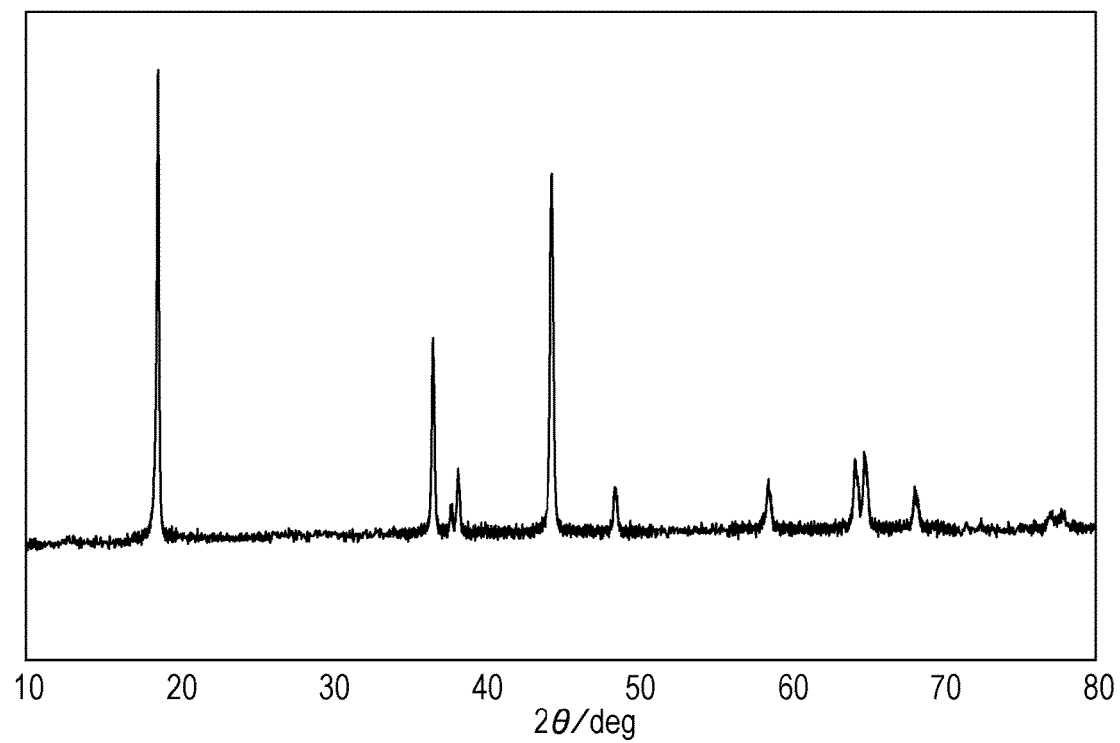
FIG. 1 is a graph showing an XRD pattern of a positive electrode active material in experimental example 1.

Embodiments of the present invention will next be described in detail. However, the embodiments described below are examples for embodying the technical scope of the present invention and are not intended to limit the invention. The present invention is also applicable equally to various modifications that are made without departing from the technical idea described in the claims. First, a specific method for producing a positive electrode will be described.

Experimental Example 1

Production of Positive Electrode Active Material

First, a reaction vessel was charged with an aqueous solution prepared using cobalt sulfate, nickel sulfate, and manganese sulfate and containing cobalt ions, nickel ions, and manganese ions, and the molar ratio of nickel, cobalt, and manganese (nickel:cobalt:manganese) in the aqueous solution was adjusted to 5:2:3. Next, while the aqueous solution was maintained at a temperature of 30° C. and a pH of 9, an aqueous sodium hydroxide solution was added dropwise over 2 hours. A precipitate containing cobalt, nickel, and manganese was thereby obtained. Then the precipitate was filtrated, washed with water, and dried to obtain $Ni_{0.5}Co_{0.2}Mn_{0.3}(OH)_2$.

The $Ni_{0.5}Co_{0.2}Mn_{0.3}(OH)_2$ obtained by the coprecipitation method was calcined at 540° C. for 3 hours while the concentration of oxygen was adjusted to 23% by volume to thereby obtain oxide $Ni_{0.5}Co_{0.2}Mn_{0.3}O_x$. Next, the oxide and $Li_2CO_3$ were mixed at a prescribed ratio, and the mixture was calcined at 880° C. for 12 hours while the concentration of oxygen was adjusted to 25% by volume to thereby produce $Li_{1.08}Ni_{0.50}Co_{0.20}Mn_{0.30}O_2$ (lithium transition metal complex oxide) having a layered structure. Since the state of the synthesized product varies depending on the production conditions of the hydroxide (the temperature and pH during coprecipitation), the oxygen concentration during calcining, and the calcination temperature, it is necessary to appropriately control these conditions according to the intended purpose.

The crystallite size of the positive electrode active material in experimental example 1 was 71 nm. The crystallite size was determined as follows.

First, a powder X-ray diffraction system (manufactured by Rigaku Corporation) using CuKα as an X-ray source was used to obtain an XRD pattern of the lithium transition metal oxide. According to the XRD patterns obtained from all the samples, the crystal system of the lithium transition metal oxide in the experimental example was found to be hexagonal and belong to the space group R-3m because of its symmetry. The XRD pattern of the positive electrode active material in experimental example 1 is shown in FIG. 1 for reference.

Ten peaks with Miller indices of 100, 110, 111, 200, 210, 211, 220, 221, 310, and 311 in the X-ray diffraction pattern of an X-ray diffraction standard reference sample (National Institute of Standards and Technology (NIST) Standard Reference Materials (SRM) 660b (LaB6)) were used, and the integral breadth $β1$ of each peak was determined from the integrated intensity and peak height of the peak by the Pawley method using a split pseudo-voigt function.

Ten peaks with Miller indices of 003, 101, 006, 012, 104, 015, 107, 018, 110, and 113 in the X-ray diffraction pattern of the measurement sample (lithium transition metal complex oxide) were used, and the integral breadth $β2$ of each peak was determined from the integrated intensity and peak height of the peak by the Pawley method using a split pseudo-voigt function for fitting.

Using the above results, integral breadths β originating from the measurement sample were computed based on the following formula (a). Integral breadth β originating from measurement sample=$β2−β1$ (a)

The Halder-wagner method was used to compute the average crystallite size L of the measurement sample. Specifically, $β2/\tan 2θ$ was plotted against $β/(\tan θ \sin θ)$, and the slope of an approximate straight line was used as the average crystallite size L.

The lattice constants were computed using the same ten peaks in the XRD pattern of the lithium transition metal oxide that were used to compute the crystallite size, and ten peaks at 100, 110, 111, 200, 210, 211, 220, 221, 310, and 311 of NIST SRM 660b LaB6 were used for correction.

[Production of Positive Electrode]

First, the above-prepared $Li_{1.08}Ni_{0.50}Co_{0.20}Mn_{0.30}O_2$ used as the positive electrode active material, acetylene black used as a conductive agent, and polyvinylidene fluoride used as a binder were mixed at a mass ratio of 95:2.5:2.5, and then an appropriate amount of N-methyl-2-pyrrolidone (NMP) was added to prepare a positive electrode mixture slurry. Then the positive electrode mixture slurry applied to both sides of a positive electrode current collector formed from aluminum foil, dried, and then rolled using rollers to thereby produce a positive electrode having a positive electrode mixture layer formed on both sides of the positive electrode current collector.

The filling density in the positive electrode was 3.5 g/cm³.

[Production of Negative Electrode]

Artificial graphite used as a negative electrode active material, CMC (sodium carboxymethyl cellulose) used as a dispersant, SBR (styrene-butadiene rubber) used as a binder were mixed in an aqueous solution at a mass ratio of 98:1:1 to prepare a negative electrode mixture slurry. Next, the negative electrode mixture slurry was uniformly applied to both sides of a negative electrode current collector formed from copper foil, dried, and then rolled using rollers. A negative electrode including a negative electrode mixture layer formed on both sides of the negative electrode current collector was thereby obtained. The filling density of the negative electrode active material in the negative electrode was 1.63 g/cm³.

[Preparation of Nonaqueous Electrolyte Solution]

Fluoroethylene carbonate (FEC), ethylene carbonate (EC), propylene carbonate (PC), ethyl methyl carbonate (EMC), and dimethyl carbonate (DMC) were mixed at a volume ratio of 10:10:5:45:30 to prepare a solvent mixture, and lithium hexafluorophosphate ($LiPF_6$) was dissolved in the solvent mixture at a ratio of 1.4 mol/L to prepare a nonaqueous electrolyte solution.

[Production of Nonaqueous Electrolyte Secondary Battery]

The positive electrode, the negative electrode, the nonaqueous electrolyte solution, and separators formed from a polyethylene microporous film were used to produce a 18650 cylindrical nonaqueous electrolyte secondary battery having a nominal capacity of 2,300 mAh. FIG. 2 is a schematic cross-sectional view showing the produced nonaqueous electrolyte secondary battery.

The nonaqueous electrolyte secondary battery shown in FIG. 2 includes a battery case 1 made of stainless steel and an electrode assembly accommodated in the battery case 1. The electrode assembly includes a positive electrode 5, a negative electrode 6, and separators 7 made of polyethylene. The positive electrode 5 and the negative electrode 6 are wound into a spiral shape through the separators 7. An upper insulating plate 8a and a lower insulating plate 8b are disposed in the upper and lower portions, respectively, of the electrode assembly. An opening end of the battery case 1 is sealed by crimping the opening end to a sealing plate 2 through a gasket 3. One end of an aluminum-made positive electrode lead 5a is attached to the positive electrode 5, and the other end of the positive electrode lead 5a is connected to the sealing plate 2 serving also as a positive electrode terminal.

One end of a nickel-made negative electrode lead 6a is attached to the negative electrode 6, and the other end of the negative electrode lead 6a is connected to the battery case 1 serving also as a negative electrode terminal.

First, the aluminum-made positive electrode lead 5a and the nickel-made negative electrode lead 6a were attached to their respective current collectors of the positive electrode 5 and the negative electrode 6, and the positive electrode 5 and the negative electrode 6 were wound through the separators 7 to form the electrode assembly. The insulating plates 8a and 8b were disposed in the upper and lower portions, respectively, of the electrode assembly. The negative electrode lead 6a was welded to the battery case 1, and the positive electrode lead 5a was welded to the sealing plate 2 having a gas release vent. The resulting electrode assembly was contained in the battery case 1. Then the nonaqueous electrolyte solution was injected into the battery case 1 by a reduced pressure method. Finally, the opening end of the battery case 1 was crimped to the sealing plate 2 through the gasket 3, and a 18650-type nonaqueous electrolyte secondary battery was thereby completed. The thus-produced battery is hereinafter referred to as a battery A1.

Experimental Example 2

A nonaqueous electrolyte secondary battery was produced in the same manner as in experimental example 1 except that, in the production of the positive electrode active material, the $Ni_{0.5}Co_{0.2}Mn_{0.3}(OH)_2$ was calcined at 540° C. for 5 hours while the concentration of oxygen was adjusted to 25% by volume to thereby obtain oxide $Ni_{0.5}Co_{0.2}Mn_{0.3}O_x$ and that a mixture of the oxide obtained and $Li_2CO_3$ at a prescribed ratio was calcined at a temperature of 900° C. The thus-produced battery is hereinafter referred to as a battery A2. The crystallite size of the positive electrode active material in experimental example 2 was 93 nm.

Experimental Example 3

A nonaqueous electrolyte secondary battery was produced in the same manner as in experimental example 1 except that, in the production of the positive electrode active material, the temperature of the aqueous solution used in the step of obtaining the precipitate containing cobalt, nickel, and manganese was adjusted to 40° C. and the pH of the aqueous solution was adjusted to 10, that the $Ni_{0.5}Co_{0.2}Mn_{0.3}(OH)_2$ was calcined at 570° C. for 5 hours while the concentration of oxygen was adjusted to 26% by volume to thereby obtain oxide $Ni_{0.5}Co_{0.2}Mn_{0.3}O_x$, and that a mixture of the oxide obtained and $Li_2CO_3$ at a prescribed ratio was calcined at a temperature of 920° C. while the concentration of oxygen was adjusted to 28% by volume. The thus-produced battery is hereinafter referred to as a battery A3. The crystallite size of the positive electrode active material in experimental example 3 was 103 nm.

Experimental Example 4

A nonaqueous electrolyte secondary battery was produced in the same manner as in experimental example 3 except that, in the production of the positive electrode active material, the $Ni_{0.5}Co_{0.2}Mn_{0.3}(OH)_2$ was calcined at 585° C. for 5 hours while the concentration of oxygen was adjusted to 28% by volume to thereby obtain oxide $Ni_{0.5}Co_{0.2}Mn_{0.3}O_x$, and that a mixture of the oxide obtained and $Li_2CO_3$ at a prescribed ratio was calcined at a temperature of 950° C. The thus-produced battery is hereinafter referred to as a battery A4. The crystallite size in experimental example 4 was 125 nm.

Experimental Example 5

A nonaqueous electrolyte secondary battery was produced in the same manner as in experimental example 4 except that, in experimental example 4, a negative electrode prepared by adding 2% by mass of SiO to the negative electrode active material was used. The thus-produced battery is hereinafter referred to as a battery A5.

Experimental Example 6

A nonaqueous electrolyte secondary battery was produced in the same manner as in experimental example 1 except that, in the production of the positive electrode active material, the temperature of the aqueous solution was set to 45° C., and a mixture of the $Ni_{0.5}Co_{0.2}Mn_{0.3}(OH)_2$ and $Li_2CO_3$ at a prescribed ratio was calcined in air (oxygen concentration: about 21% by volume) at a temperature of 1,000° C. The thus-produced battery is hereinafter referred to as a battery Z1. The crystallite size in experimental example 6 was 142 nm.

Experimental Example 7

A nonaqueous electrolyte secondary battery was produced in the same manner as in experimental example 4 except that an electrolyte solution containing lithium hexafluorophosphate ($LiPF_6$) dissolved at a ratio of 1.2 mol/L in a solvent mixture prepared by mixing ethylene carbonate (EC), propylene carbonate (PC), and dimethyl carbonate (DMC) at a volume ratio of 25:5:70 was used as a nonaqueous electrolyte solvent. The thus-produced battery is hereinafter referred to as a battery Z2.

Experimental Example 8

A nonaqueous electrolyte secondary battery was produced in the same manner as in experimental example 1 except that the positive electrode active material in experimental example 6 and the nonaqueous electrolyte solution in experimental example 7 were used. The thus-produced battery is hereinafter referred to as a battery Z3.

[Evaluation of Batteries]

The batteries A1 to A4 and Z1 to Z3 obtained as described above were used to measure their DC-IR and cycle capacity retention rate by the following methods, and the results are shown in Table 1 below.

Charge-Discharge Conditions

Each battery was charged at a constant current of 1,150 mA [0.5 It] until the battery voltage reached 4.10 V, charged at a constant voltage of 4.10 V until the current value reached 46 mA, left at rest for 10 minutes, discharged at 1,150 mA [0.5 It] until the battery voltage reached 3.0 V, and then left at rest for 20 minutes. The temperature during charge and discharge was 25° C.

DC-IR Measurement

Each of the batteries A1 to A4 and Z1 to Z3 was charged and discharged 2 times and then 500 times under the above conditions. After the charge/discharge cycle was repeated 2 or 500 times, each battery was charged to 50% of its discharge capacity (mAh), left to rest for 20 minutes, and then discharged at 1,150 mA [0.5 It] for 10 seconds, and the DC-IR was computed using formula (1).

DC-IR=(battery voltage immediately before discharge−battery voltage after discharge 10 seconds)/1,150    (1)

The DC-IR values in Table 1 are expressed as relative values with the DC-IR value of the battery A2 as 100.

Cycle Capacity Retention Rate

Each battery was repeatedly charged and discharged 500 times, and the capacity retention rate was computed using formula (2) below.

Capacity retention rate (%)=(discharge capacity at 500 cycles/discharge capacity at first cycle)×100    (2)

TABLE 1

|  | Presence of FEC | Crystallite size nm | DC-IR (relative value with DC-IR of battery A2 as 100) | | Capacity retention rate (%) after 500 cycles |
| --- | --- | --- | --- | --- | --- |
|  |  |  | After 2 cycles | After 500 cycles/ after 2 cycles |  |
| Battery A1 | Yes | 71 | 102 | 106 | 95 |
| Battery A2 | Yes | 93 | 100 | 100 | 96 |
| Battery A3 | Yes | 103 | 102 | 114 | 96 |
| Battery A4 | Yes | 125 | 98 | 102 | 94 |
| Battery Z1 | Yes | 142 | 95 | 137 | 87 |
| Battery Z2 | No | 125 | 84 | 131 | 87 |
| Battery Z3 | No | 142 | 83 | 133 | 85 |

As can be seen from the results in Table 1, in the results of the DC-IR after 2 cycles, the DC-IR values of the batteries A1 to A4 in which the electrolyte contained FEC were higher than those of the batteries Z2 and Z3 containing no FEC. This may be because, since the electrolyte in the batteries A1 to A4 contained FEC, a coating originating from the FEC was formed on the surface of the positive electrode active material in the early stage of the charge-discharge cycles.

In the results of the DC-IR after 500 cycles, the DC-IR values of the batteries Z2 and Z3 were larger than those of the batteries A1 to A4. The reason for this may be as follows. Since the electrolyte in the batteries A1 to A4 contained FEC, a good coating was formed on the surface of the positive electrode active material in the early stage of the charge-discharge cycles. Therefore, a side reaction with the electrolyte during charge-discharge after 500 cycles was suppressed, and the change in the DC-IR as compared to that after 2 cycles was small.

In the batteries Z2 and Z3, the electrolyte contained no FEC. Therefore, a good coating was not formed on the surface of the positive electrode active material, and the oxidative decomposition reaction of the electrolyte proceeded on the surface of the positive electrode active material during charge-discharge after 500 cycles, causing the deterioration of the surface of the positive electrode and the deposition of the decomposition products on the surface. This may be the reason that the DC-IR value after 500 cycles was large.

As the voltage drop of a battery before and after discharge at a state-of-charge of about 50% (also referred to as a SOC of about 50%) increases, the DC-IR value increases. This indicates that the smaller the DC-IR value, the more preferable it is.

In the batteries A1 to A4, the capacity retention rate after 500 cycles was 94 to 96%. However, in the batteries Z2 and Z3, the capacity retention rate after 500 cycles was 85 to 87%. This shows that the cycle characteristics are improved in the batteries A1 to A4.

In the battery Z1 in which the electrolyte contained FEC, the DC-IR value after 500 cycles was larger than that of the battery Z3 in which the electrolyte contained no FEC. The reason for this is as follows. If the crystallite size is larger than 140 nm, even when a coating is formed on the surface of the positive electrode active material, the coating is broken because of expansion and contraction of the crystals of the positive electrode active material in a specific direction, particularly in the c-axis direction, during charge and discharge. In this case, the decomposition products originating from FEC are unevenly distributed on the surface of the positive electrode active material. This causes a reduction in the electron conductivity of the positive electrode active material, so that the current concentrates on portions in which the amount of deposition of the decomposition products is small and the electronic resistance is small. Therefore, the positive electrode active material deteriorates, and the cycle characteristics are impaired.

The change in the crystal lattice of the positive electrode active material in its c-axis direction is suppressed preferably within the range of 0.33 Å or less, more preferably 0.30 Å or less, and particularly preferably within the range of 0.26 Å or less. This is because, if the change in the lattice in the c-axis direction exceeds 0.33 Å, the effect of improving the cycle characteristics may become small. The change in the lattice is the difference between the c-axis length of the positive electrode in its discharged state and the c-axis length of the positive electrode in its charged state. In experimental example 1, the c-axis length of the positive electrode in the discharged state after 2 cycles was 14.29 Å, the c-axis length of the positive electrode in the charged state was 14.53 Å, so that the change in the lattice was 0.24 Å.

As can be seen from the above results, when FEC is simply added to the electrolyte, the effect of improving the cycle characteristics is insufficient. This effect is closely correlated with the crystallite size of the positive electrode active material. Specific combinations of the crystallite size of the positive electrode active material and the addition of FEC to the electrolyte can provide an unexpected effect.

The size of the crystals of the positive electrode active material must be 140 nm or less. If the crystallite size is less than 40 nm, the growth of the crystals is insufficient. In this case, the intercalation and deintercalation of lithium are difficult, so that the capacity of the positive electrode becomes low. Therefore, the crystallite size of the positive electrode active material is preferably within the range of from 40 nm to 140 nm inclusive and more preferably within the range of from 60 nm to 140 nm inclusive. When the crystallite size is set within the above range, the positive electrode active material is expanded and contracted uniformly in the early stage of charging, and a good coating originating from FEC is formed uniformly, so that the cycle characteristics are further improved.

The amount of FEC in the electrolyte is preferably from 2% by volume to 30% by volume inclusive and more preferably from 5% by volume to 30% by volume inclusive. This is because, if the amount of FEC is less than 2% by volume, a satisfactory coating is not formed on the surface of the positive electrode active material, and an increase in the resistance of the positive electrode active material after it undergoes cycles for a long time cannot be suppressed.

An amount of FEC exceeding 30% by volume is not preferable because the amount of gas generated due to the decomposition of the electrolyte becomes large when the charge-discharge cycle is repeated and this may cause the relief valve of the battery to open.

The results of measurement of the DC-IR of the batteries A4 and A5 according to the present invention after 400 cycles are shown in Table 2. The DC-IR was measured by the same method as the above-described DC-IR measurement method except that the number of cycles was changed to 400. The DC-IR values in Table 2 are expressed as relative values with the DC-IR value of the battery A5 as 100.

TABLE 2

|  | DC-IR (relative value with DC-IR of battery A5 as 100) After 400 cycles |
| --- | --- |
| Battery A4 | 104 |
| Battery A5 | 100 |

As can be seen from the results in Table 2, by comparing the battery A5 in which the negative electrode active material contained SiO with the battery A4 in which the negative electrode active material contained no SiO, the DC-IR value after 400 cycles was smaller in the battery A5. The may be because of the following reason. When the negative electrode active material contains SiO, the charge/discharge efficiency of the negative electrode in the early stage of the cycles can be reduced, and the change in the lattice of the positive electrode can be limited to 0.33 Å or less.

The amount of SiO added to the negative electrode active material is preferably from 1% by mass to 20% by mass inclusive. If the amount of SiO added is less than 1% by mass, the effect of limiting the change in the lattice of the positive electrode by SiO is small. If the amount of SiO exceeds 20% by mass, the irreversible capacity becomes large, and the battery capacity decreases.

(Other Considerations)

The positive electrode active material of the nonaqueous electrolyte secondary battery of the present invention may contain at least one selected from the group consisting of boron (B), fluorine (F), magnesium (Mg), aluminum (Al), chromium (Cr), vanadium (V), iron (Fe), copper (Cu), zinc (Zn), molybdenum (Mo), zirconium (Zr), tin (Sn), tungsten (W), titanium (Ti), niobium (Nb), tantalum (Ta), sodium (Na), potassium (K), and rare earth elements. The amount of such an element added with respect to the transition metals in the lithium transition metal complex oxide is preferably from 0.1 mol % to 5.0 mol % or less inclusive and particularly preferably from 0.1 mol % to 3.0 mol % or less inclusive. This is because, if the amount added exceeds 5.0 mol %, the capacity deceases, and a reduction in energy density occurs. If the amount added is less than 0.1 mol %, the influence of the additive element on crystal growth becomes low.

It is unnecessary that the positive electrode active material used for the nonaqueous electrolyte secondary battery of the present invention is limited only to the above-described positive electrode active materials. No particular limitation is imposed on the positive electrode active material, so long as it is a compound having a layered structure that allows reversible intercalation and deintercalation of lithium. Examples of the lithium transition metal complex oxide include lithium cobaltate, lithium Ni—Mn—Al complex oxide, lithium Ni—Co—Al complex oxide, lithium Co—Mn complex oxide, transition metal oxides containing iron, manganese, etc. A mixture of one of the above active materials (this active material is at least one selected from the group consisting of Li, Ni, Mn, Co, Fe, and rare earth elements) with a compound having the spinel structure, a phosphate compound, a borate compound, or a silicate compound may be used.

The filling density in the positive electrode used for the nonaqueous electrolyte secondary battery of the present invention is preferably from 2.0 g/cm$^3$ to 4.0 g/cm$^3$ inclusive and particularly preferably from 2.8 g/cm$^3$ to 3.7 g/cm$^3$ inclusive. This is because of the following reason. If the filling density in the positive electrode exceeds 4.0 g/cm$^3$, the amount of the electrolyte in the positive electrode becomes low, and a reduction in cycle characteristics due to heterogeneous reaction occurs. If the filling density in the positive electrode is less than 2.0 g/cm$^3$, not only the energy density but also the electron conductivity in the positive electrode becomes low, and a reduction in capacity and a reduction in cycle characteristics due to heterogeneous reaction occur.

The negative electrode active material of the nonaqueous electrolyte secondary battery of the present invention may be a combination of at least two materials, e.g., a combination of a carbon material such as natural graphite, coke, partially-graphitized carbon, carbon fibers, spherical carbon, artificial carbon, or amorphous carbon with a metal, metal fibers, an oxide, a nitride, a tin compound, a silicon compound, any of various alloy materials, etc. The material used together with the carbon material is preferably a single element such as silicon (Si) or tin (Sn) or a silicon or tin compound in the form of alloy, compound, or solid solution because of their high capacity density. The silicon compound used may be, for example, $SiO_x$ (0.05<x<1.95) or may be an alloy, compound, or solid solution produced by substituting part of Si in the silicon compound with at least one element selected from the group consisting of B, Mg, Ni, Ti, Mo, Co, Ca, Cr, Cu, Fe, Mn, Nb, Ta, V, W, Zn, C, N, and Sn. More preferably, in the silicon oxide, the ratio of oxygen atoms to silicon atoms (O/Si) is 0.5 to 1.5. Examples of the usable tin compound include $Ni_2Sn_4$, $Mg_2Sn$, $SnO_x$ (0<x<2), $SnO_2$, and $SnSiO_3$. In addition to the above-described materials, materials such as lithium titanate that have a higher charge/discharge potential with respect to metal lithium than the carbon materials etc. may be used, although the energy density becomes low.

Examples of the binders usable for the positive electrode and the negative electrode include polyvinylidene fluoride, polytetrafluoroethylene, polyethylene, polypropylene, aramid resins, polyamides, polyimides, polyamide-imides, polyacrylonitrile, polyacrylic acid, poly(methyl acrylate), poly(ethyl acrylate), poly(hexyl acrylate), polymethacrylic acid, poly(methyl methacrylate), poly(ethyl methacrylate), poly(hexyl methacrylate), polyvinyl acetate, polyvinylpyrrolidone, polyethers, polyethersulfone, hexafluoropolypropylene, styrene-butadiene rubber, and carboxymethyl cellulose. In addition, a copolymer of at least two materials selected from tetrafluoroethylene, hexafluoroethylene, hexafluoropropylene, perfluoroalkyl vinyl ethers, vinylidene fluoride, chlorotrifluoroethylene, ethylene, propylene, pentafluoropropylene, fluoromethyl vinyl ether, acrylic acid, and hexadiene may be used. A mixture of at least two selected from the above materials may be used.

Examples of the conductive agent contained in the electrodes include: graphite such as natural graphite and artificial graphite; carbon blacks such as acetylene black, Ketjen black, channel black, furnace black, lamp black, thermal black, and carbon nanotubes; conductive fibers such as carbon fibers, e.g., vapor-grown carbon fibers (VGCF), and metal fibers; carbon fluoride; metal powders such as aluminum powder; conductive whiskers such as zinc oxide and potassium titanate whiskers; conductive metal oxides such as titanium oxide; and organic conductive materials such as phenylene derivatives.

The range of the mixing ratio of the positive electrode, the conductive agent, and the binder is preferably 80 to 99% by mass of the positive electrode, 0.5 to 20% by mass of the conductive agent, and 0.5 to 20% by mass of the binder. This is because of the following reasons. If the amount of the positive electrode active material is less than 80% by mass, the energy density becomes low. If the amount of the positive electrode active material is more than 99% by mass, the electron conductivity of the positive electrode becomes low, and a reduction in capacity and a reduction in cycle characteristics due to heterogeneous reaction occur. The range of the mixing ratio of the negative electrode active material and the binder is preferably 93 to 99% by mass of the negative electrode active material and 1 to 10% by mass of the binder. If the amount of the negative electrode active material is less than 93% by mass, the energy density becomes low. If the amount of the negative electrode active material is more than 99% by mass, the amount of the binder is insufficient, and collapse of the active material occurs.

Each of the current collectors used is a long conductive substrate having a porous structure or a long nonporous conductive substrate. Examples of the material used for the conductive substrate for the positive electrode current collector include stainless steel, aluminum, and titanium. Examples of the material used for the conductive substrate for the negative electrode current collector include stainless steel, nickel, and copper. No particular limitation is imposed on the thickness of these current collectors. The thickness is preferably 1 to 500 μm and more preferably 5 to 20 μm. When the thickness of the current collectors is within the above range, a reduction in weight can be achieved while the strength of the electrode plates is maintained.

As the separator interposed between the positive electrode and the negative electrode, microporous thin films, woven fabrics, nonwoven fabrics, etc. that have high ionic permeability, prescribed mechanical strength, and insulating properties may be used. From the viewpoint of the safety of the nonaqueous electrolyte secondary battery, the material of the separator is preferably polyolefins such as polypropylene and polyethylene because of their high durability and shutdown function. The thickness of the separator is generally 6 to 300 μm and preferably 40 μm or less. The thickness is more preferably within the range of 10 to 30 μm and still more preferably 10 to 25 μm. The microporous film may be a single layer film made of one material or may be a composite or multilayer film made of one or at least two materials. The porosity of the separator is preferably within the range of 30 to 70%. The porosity is the volume ratio of pores to the volume of the separator. A more preferred range of the porosity of the separator is 35 to 60%.

No limitation is imposed on the solute of the nonaqueous electrolyte used in the present invention, and any solute conventionally used for nonaqueous electrolyte secondary batteries may be used. The lithium salt used may be, for example, a lithium salt containing at least one element selected from P, B, F, O, S, N, and Cl, and specific examples of such a lithium salt include $LiPF_6$, $LiBF_4$, $LiN(SO_2F)_2$, $LiN(SO_2CF_3)_2$, $LiN(SO_2C_2F_5)_2$, $LiPF_{6-x}(C_nF_{2n-1})_x$ (where $1<x<6$, and $n=1$ or 2), and $LiPO_2F_2$. In addition to the above lithium salts, lithium salts containing oxalato complexes as anions may also be used. Examples of the lithium salts containing oxalato complexes as anions include LiBOB [lithium-bisoxalatoborate]. In addition, lithium salts with anions $C_2O_4^{2-}$ coordinated to center atoms may also be used, such as a lithium salt represented by $Li[M(C_2O_4)_xR_y]$ (wherein M is a transition metal, i.e., an element selected from groups IIIb, IVb, and Vb in the periodic table, R is a group selected from halogens, alkyl groups, and halogen-substituted alkyl groups, x is a positive integer, and y is 0 or a positive integer). Specific examples include $Li[B(C_2O_4)F_2]$, $Li[P(C_2O_4)F_4]$, and $Li[P(C_2O_4)_2]F_2$.

Only one of these solutes may be used, or a mixture of two or more may be used. No particular limitation is imposed on the concentration of the solute, but the concentration is preferably 0.8 to 1.7 moles per liter of the electrolyte.

The solvent used for the nonaqueous electrolyte used in the present invention may be a mixture of FEC and any of the following solvents: cyclic carbonates such as ethylene carbonate, propylene carbonate, butylene carbonate, and vinylene carbonate; chain carbonates such as dimethyl carbonate, methyl ethyl carbonate, and diethyl carbonate; ester-containing compounds such as methyl acetate, ethyl acetate, propyl acetate, methyl propionate, ethyl propionate, and γ-butyrolactone; sulfone group-containing compounds such as propanesultone; ether-containing compounds such as 1,2-dimethoxyethane, 1,2-diethoxyethane, tetrahydrofuran, 1,2-dioxane, 1,4-dioxane, and 2-methyltetrahydrofuran; nitrile-containing compounds such as butyronitrile, valeronitrile, n-heptanenitrile, succinonitrile, glutaronitrile, adiponitrile, pimelonitrile, 1,2,3-propanetricarbonitrile, and 1,3,5-pentanetricarbonitrile; amide-containing compounds such as dimethylformamide; and other solvents. Particularly, a solvent in which H atoms are partially or fully substituted with F atoms may be used. One of these solvent or any combination of a plurality of these solvents may be used. Particularly, a solvent prepared by combining a cyclic carbonate and a chain carbonate and a solvent prepared by combining the above solvent combination with a small amount of a nitrile- or ether-containing compound are preferred.

The nonaqueous electrolyte solution may contain any known benzene derivative that decomposes during overcharging and forms a coating on the electrodes to inactivate the battery. Preferably, the benzene derivative has a phenyl group and a cyclic compound group adjacent to the phenyl group. The cyclic compound group is preferably a phenyl group, a cyclic ether group, a cyclic ester group, a cycloalkyl group, a phenoxy group, etc. Specific examples of the benzene derivative include cyclohexylbenzene, biphenyl, diphenyl ether, and tert-amylbenzene. These may be used alone, or a combination of two or more may be used. However, the content of the benzene derivative is preferably 10% by volume or less with respect to the total amount of the nonaqueous solvent.

A layer formed of a conventionally used inorganic filler may be formed at the boundary between the positive electrode and the separator or at the boundary between the negative electrode and the separator. The filler used may be any conventionally used filler, and examples thereof include: oxides and phosphate compounds prepared using one of titanium, aluminum, silicon, and magnesium; oxides and phosphate compounds prepared using a plurality of these elements; and fillers prepared by treating the surfaces of these oxides and phosphate compounds with hydroxides etc.

To form the filler layer, a formation method may be used, in which a filler-containing slurry is applied directly to the positive electrode, the negative electrode, or the separator. Alternatively, a method may be used, in which a sheet formed from the filler is applied to the positive electrode, the negative electrode, or the separator.

An exterior member used in the present invention may be an aluminum can, a stainless steel can, etc. for a cylindrical battery. In addition, an aluminum laminate that can be easily deformed may be used.

INDUSTRIAL APPLICABILITY

The nonaqueous electrolyte secondary battery according to one aspect of the present invention can be used for applications such as mobile phones, notebook personal computers, smartphones, tablet terminals, etc. that require particularly high capacity and long life.

REFERENCE SIGNS LIST

1: battery case, 2: sealing plate, 5: positive electrode, 6: negative electrode, 7: separator

The invention claimed is:

1. A nonaqueous electrolyte secondary battery comprising a positive electrode containing a positive electrode active material, a negative electrode containing a negative electrode active material, a separator interposed between the positive electrode and the negative electrode, and a nonaqueous electrolyte, wherein the positive electrode active material is a layered lithium transition metal oxide, the positive electrode active material has a crystallite size of 140 nm or less, the negative electrode active material contains at least carbon, and the nonaqueous electrolyte contains 2 to 30% by volume of fluoroethylene carbonate, the positive electrode active material containing Ni and at least one additional metal element other than Li, wherein the percentage of Ni relative to a total number of moles of the at least one additional metal element other than Li is 50% or more by mole, and wherein the positive electrode active material is $Li_xNi_{0.5}Co_{0.2}Mn_{0.3}O_2$ ($1.0 \leq x \leq 1.1$).

2. The nonaqueous electrolyte secondary battery according to claim 1, wherein the crystallite size of the positive electrode active material is within the range of from 40 nm to 140 nm inclusive.

3. The nonaqueous electrolyte secondary battery according to claim 1, wherein a change in the lattice of the positive electrode active material in a c-axis direction during charge and discharge is within the range of 0.33 Å or less.

4. The nonaqueous electrolyte secondary battery according to claim 1, wherein the negative electrode active material includes a silicon oxide and carbon.

5. The nonaqueous electrolyte secondary battery according to claim 4, wherein the ratio of the mass of the silicon oxide to the total mass of the silicon oxide and the carbon is from 1% by mass to 20% by mass inclusive.

6. The nonaqueous electrolyte secondary battery according to claim 1, wherein the ratio of oxygen atoms to silicon atoms in the silicon oxide (O/Si) is from 0.5 to 1.5 inclusive.

* * * * *